US012774894B2

(12) United States Patent
Ellison et al.

(10) Patent No.: US 12,774,894 B2
(45) **Date of Patent: *Oct. 27, 2026**

(54) VEHICLE CHARGING PATH OPTIMIZATION SYSTEMS AND METHODS

(71) Applicant: Innovation Technologies Partners LP, Austin, TX (US)

(72) Inventors: Gary Ellison, San Mateo, CA (US); Mark Kokes, Danville, CA (US)

(73) Assignee: Innovation Technologies Partners LP, Austin, TX (US)

( * ) Notice: Subject to any disclaimer, the term of this patent is extended or adjusted under 35 U.S.C. 154(b) by 205 days.

This patent is subject to a terminal disclaimer.

(21) Appl. No.: 18/657,746

(22) Filed: May 7, 2024

(65) Prior Publication Data

US 2024/0288275 A1 Aug. 29, 2024

Related U.S. Application Data

(63) Continuation of application No. 16/795,055, filed on Feb. 19, 2020, now Pat. No. 12,111,166, which is a (Continued)

(51) Int. Cl.
*G01C 21/34* (2006.01)
*B60L 53/66* (2019.01)
(Continued)

(52) U.S. Cl.
CPC .......... *G01C 21/3469* (2013.01); *B60L 53/66* (2019.02); *B60L 53/67* (2019.02);
(Continued)

(58) Field of Classification Search
CPC . G01C 21/3469; G01C 21/3679; B60L 53/66; B60L 53/67; B60L 2240/62;
(Continued)

(56) References Cited

U.S. PATENT DOCUMENTS 8,234,387 B2 7/2012 Bradley et al.
2007/0180519 A1 8/2007 Boccon-Gibod et al.
(Continued)

FOREIGN PATENT DOCUMENTS

DE 102009024528 3/2010
JP 2010230499 10/2010
(Continued)

OTHER PUBLICATIONS

PCT Patent Application US2013/068960 filed Nov. 7, 2013; International Search Report and Written Opinion dated Feb. 7, 2014.
(Continued)

*Primary Examiner* — Nga X Nguyen
(74) *Attorney, Agent, or Firm* — John P. Davis; Thayne and Davis LLC

(57) ABSTRACT

Systems and methods are described for determining an optimal path and/or route to a destination for a vehicle. Embodiments of the systems and methods disclosed herein facilitate intelligent route planning to a desired destination by a vehicle. In certain embodiments, a path and/or route to a desired destination is determined that accounts for vehicle charging and/or refueling requirements. Disclosed systems and methods may further generate and distribute reservation information ensuring availability of vehicle charging and/or refueling stations along a selected route. Further embodiments disclosed herein may implement information targeting services in connection with intelligent route planning.

19 Claims, 8 Drawing Sheets

Related U.S. Application Data continuation of application No. 14/074,081, filed on Nov. 7, 2013, now Pat. No. 10,598,503.

(60) Provisional application No. 61/723,527, filed on Nov. 7, 2012.

(51) Int. Cl.

| | |
|---|---|
| ***B60L 53/67*** | (2019.01) |
| ***G01C 21/36*** | (2006.01) |
| ***G06Q 10/047*** | (2023.01) |
| ***G06Q 30/0251*** | (2023.01) |

(52) U.S. Cl.

CPC ....... *G01C 21/3679* (2013.01); *G06Q 10/047* (2013.01); *G06Q 30/0251* (2013.01); *B60L 2240/62* (2013.01); *B60L 2240/72* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(58) Field of Classification Search

CPC .............. B60L 2240/72; G06Q 10/047; G06Q 30/0251; Y02T 10/7072; Y02T 10/72; Y02T 90/12; Y02T 90/14; Y02T 90/16; Y02T 10/07; Y02T 10/70

See application file for complete search history.

(56) References Cited

U.S. PATENT DOCUMENTS

| | | | |
|---|---|---|---|
| 2009/0138194 A1 | 5/2009 | Geelen | |
| 2010/0035637 A1 | 2/2010 | Varanasi et al. | |
| 2010/0094496 A1 | 4/2010 | Hershkovitz et al. | |
| 2010/0205060 A1 | 8/2010 | Athsani et al. | |
| 2010/0293049 A1 | 11/2010 | Maher et al. | |
| 2011/0032110 A1 | 2/2011 | Taguchi | |
| 2011/0118976 A1 | 5/2011 | Harding | |
| 2011/0288765 A1* | 11/2011 | Conway ........... | G08G 1/096816 701/533 |
| 2012/0123670 A1* | 5/2012 | Uyeki .................. | G01C 21/165 707/802 |
| 2013/0179057 A1* | 7/2013 | Fisher ..................... | B60L 53/66 701/1 |
| 2013/0212659 A1 | 8/2013 | Maher et al. | |
| 2013/0226443 A1 | 8/2013 | Scofield et al. | |
| 2013/0332987 A1 | 12/2013 | Tenneti et al. | |
| 2014/0006137 A1 | 1/2014 | Melen et al. | |
| 2014/0278091 A1 | 9/2014 | Horvitz et al. | |
| 2015/0127248 A1 | 5/2015 | Fisher et al. | |

FOREIGN PATENT DOCUMENTS

| | | |
|---|---|---|
| KR | 20100029613 | 3/2010 |
| KR | 20110041841 | 4/2011 |
| KR | 20120036563 | 4/2012 |

OTHER PUBLICATIONS

Notice of Allowance issued in U.S. Appl. No. 14/074,081 dated Nov. 6, 2019.

Final Office Action issued in U.S. Appl. No. 14/074,081 dated Sep. 29, 2016.

Non-Final Ofice Action issued in U.S. Appl. No. 14/074,081 dated May 5. 2016.

Non-Final Office Action issued in U.S. Appl. No. 14/074,081 dated Jan. 11, 2019.

Final Office Action issued in U.S. Appl. No. 14/074,081 dated Aug. 2, 2018.

Non-Final Office Action issued in U.S. Appl. No. 14/074,081 dated Dec. 28, 2017.

Final Office Action issued in U.S. Appl. No. 14/074,081 dated Jul. 7, 2017.

Non-Final Office Action issued in U.S. Appl. No. 14/074,081 dated Feb. 7, 2017.

Final Office Action issued in U.S. Appl. No. 14/074,081 dated Sep. 28, 2015.

Non-Final Office Action Issued in U.S. Appl. No. 14/074,061 dated Mar. 25. 2015.

Notice of Allowance issued in U.S. Appl. No. 16/795,055 dated May 30, 2024.

Notice of Allowance issued in U.S. Appl. No. 16/795,055 dated Feb. 7, 2024.

Final Office Action issued in U.S. Appl. No. 16/795,055 dated Sep. 20, 2023.

Non-final Office Action issued in U.S. Appl. No. 16/795,055 dated Apr. 12, 2023.

Final Office Action issued in U.S. Appl. No. 16/795,055 dated Oct. 31, 2022.

Non-final Office Action issued in U.S. Appl. No. 16/795,055 dated Jul. 15, 2022.

* cited by examiner

VEHICLE CHARGING PATH OPTIMIZATION SYSTEMS AND METHODS

RELATED APPLICATIONS

This application is a continuation of U.S. application Ser. No. 16/795,055, filed Feb. 19, 2020, which is a continuation of U.S. application Ser. No. 14/074,081, filed Nov. 7, 2013, now issued as U.S. Pat. No. 10,598,503, which claims the benefit of priority under 35 U.S.C. § 119(e) to U.S. Provisional Application No. 61/723,527, filed Nov. 7, 2012, all of which are titled "VEHICLE CHARGING PATH OPTIMIZATION SYSTEMS AND METHODS," and all of which are hereby incorporated by reference in their entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND AND SUMMARY

Systems and methods are disclosed for determining an optimal path and/or route to a destination for a vehicle. More specifically, in some embodiments, systems and methods are described for determining an optimal charging path and/or route to a destination for an electric vehicle ("EV") and a reservation generation system for use in connection with the same.

When operating a vehicle, it is often desirable to optimize the total travel time and/or cost associated with arriving at a desired destination. Vehicles, however, may have a limited range before an energy source used to power the vehicle is depleted. Once the energy source is depleted, a refueling and/or recharging operation may be needed for the vehicle to continue operation. Accounting for inherent limitations in vehicle energy sources may allow for better optimization of vehicle travel times and/or costs.

In a hybrid-electric vehicle ("HEV"), a plug-in hybrid electric vehicle ("PHEV"), a fuel cell electric vehicle ("FCEV"), and/or a purely electric vehicle ("EV"), a battery system may be used to power electric drivetrain components of the vehicle (e.g., electric drive motors and the like). Vehicle battery systems may have limited charge capacities, lengthy recharging times, and/or be limited for use in connection with relatively sparse charging infrastructures. A variety of other types of vehicles (e.g., natural gas vehicles, conventional internal combustion engine vehicles, fuel cell vehicles, etc.) may have similar limitations and require periodic refueling. Accordingly, it is desirable to strategically plan a trip to a desired destination that takes into account vehicle charging and/or fueling requirements.

Embodiments of the systems and methods disclosed herein facilitate intelligent route planning to a desired destination by a vehicle. In certain embodiments, systems and methods are provided that allow for determination of a path and/or route (e.g., an optimal route) to a desired destination that accounts for vehicle charging and/or refueling requirements. In certain embodiments, a variety of routing parameters may be utilized in determining a path and/or a route to a desired destination. For example, vehicle charge and/or fuel capacities, charging and/or refueling times, charging and/or refueling infrastructure compatibility and availability, energy source pricing, geographic and environmental factors (e.g., traffic conditions, elevation changes, average historical travel times along routes, etc.), consumer ratings, and/or any other relevant parameter or parameters may be utilized in connection with determining an optimal route of a vehicle to a desired destination.

In some embodiments, a variety of possible routes to a desired destination based on available routing parameters may be presented to a user of a vehicle. A user may select a route from the identified routes and be provided with directed driving instructions associated with the selected route to the destination (e.g., via turn-by-turn directions or the like). In further embodiments, an optimal route may be automatically selected and/or recommended to a user based on a calculated cost associated with the route. In certain embodiments, the calculated cost may account for a variety of factors including, without limitation, travel time along the route, predicted energy usage along the route, pricing at recharging and/or refueling stations along the route, and/or any other relevant routing parameter associated with the route. Automatically selecting and/or presenting a user with a recommended optimal route may allow for a shorter, more efficient, and/or less expensive journey to a desired destination in an associated vehicle.

Further embodiments disclosed herein may implement targeted information delivery services (e.g., targeted advertising, targeted promotions, etc.) in connection with intelligent route planning. For example, interests and/or other personal information associated with a user may be utilized to identify one or more points of interest ("POI") proximate to an identified route that the user may have an interest in visiting during the journey to his or her destination. The identified POIs, associated targeted advertisements, offers, and/or other information may be presented to a user in connection with one or more identified routes. Using such information, a user may select a route having nearby POIs that they may wish to visit on their way to a desired destination. In further embodiments, identified POIs may be utilized in connection with calculating costs associated with a particular route for use in selecting and/or recommending an optimal route.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
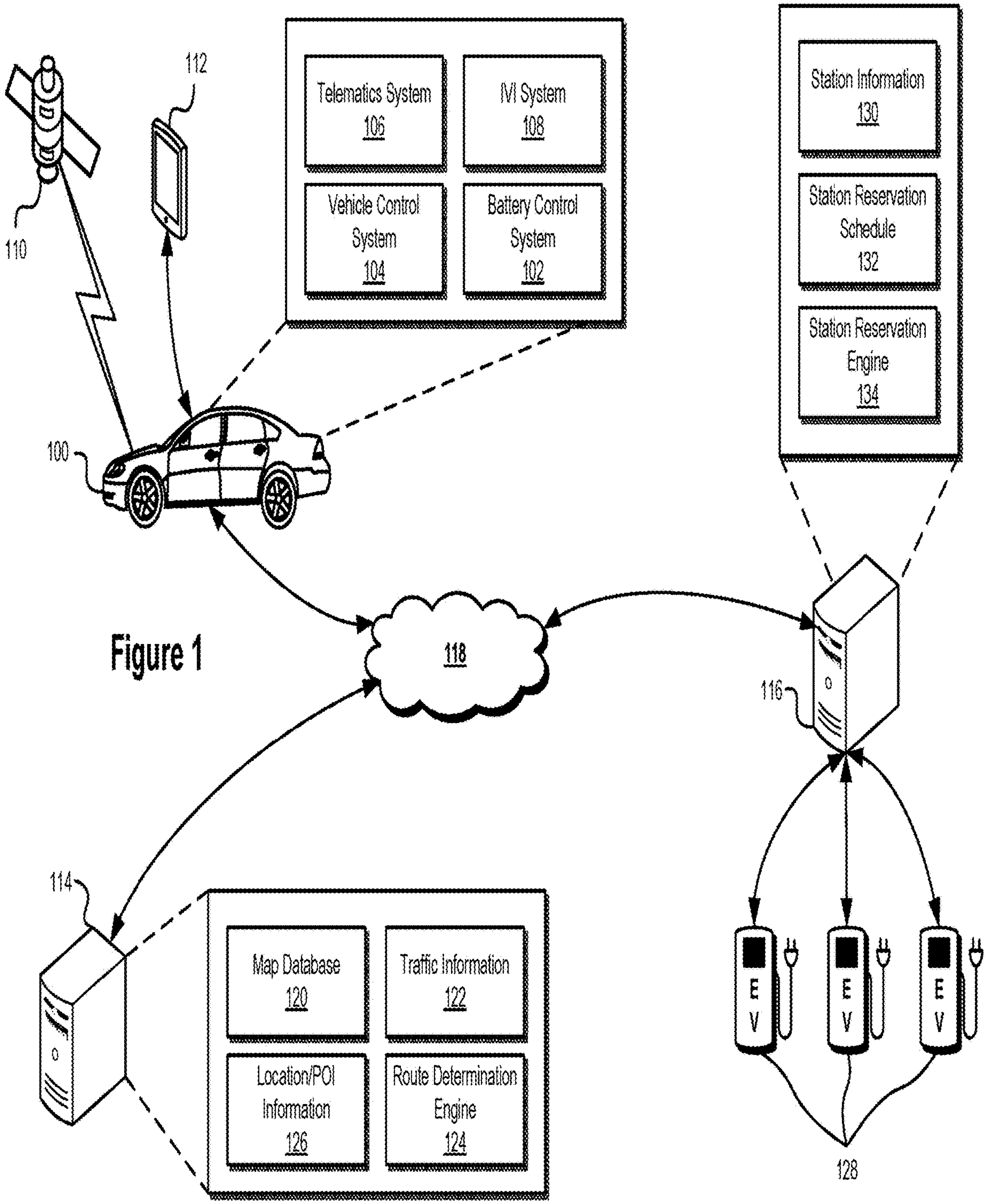
FIG. 1 illustrates an exemplary architecture for a connected vehicle consistent with embodiments of the present disclosure.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

In certain embodiments, the systems and methods described herein can, for example, be used in connection with vehicle security technologies such as those described in commonly assigned, co-pending U.S. patent application Ser. No. 13/766,432, "Trusted Networked Vehicle Systems and Methods," filed Feb. 13, 2013 and published as 2013/0212659 A1 ("the '432 application"), digital rights management ("DRM") technologies such as that described in commonly assigned, co-pending U.S. patent application Ser. No. 11/583,693, "Digital Rights Management Engine Systems and Methods," filed Oct. 18, 2006 and published as U.S. Pub. No. 2007/0180519 A1 ("the '693 application"), and/or service orchestration and DRM technologies such as those described in commonly assigned U.S. Pat. No. 8,234,387, "Interoperable Systems and Methods for Peer-to-Peer Service Orchestration" ("the '387 patent") (the contents of the '432 application, the '693 application, and the '387 patent hereby being incorporated by reference in their entireties), as well as in other contexts. In further embodiments, the systems and methods described herein can be used in connection with personalized service technologies including, for example, information targeting technologies such as those described in commonly assigned co-pending U.S. patent application Ser. No. 12/785,406, filed May 21, 2010 ("the '406 application") and/or U.S. patent application Ser. No. 13/914,538, filed Jun. 10, 2013 ("the '538 application"), both of which are incorporated herein by reference in their entireties. It will be appreciated that these systems and methods are novel, as are many of the components, systems, and methods employed therein.

FIG. 1 illustrates an exemplary architecture for a connected vehicle 100 consistent with embodiments of the present disclosure. More specifically, FIG. 1 illustrates a connected vehicle 100 and an associated ecosystem consistent with embodiments disclosed herein. The vehicle 100 may comprise a passenger or transport vehicle, a marine vehicle, an aircraft, and/or any other type of vehicle suitable for implementing the systems and methods disclosed herein. Although discussed below in reference to a vehicle 100 having a battery system configured to power electric drivetrain components (e.g., as in an HEV, a PHEV, an FCEV, and/or a purely EV), it will be appreciated that systems and methods disclosed herein may be implemented in connection with any vehicle including vehicles powered by fuel cell systems and/or conventional internal combustion engines (e.g., gasoline, natural gas, diesel, etc.).

The vehicle 100 may include one or more Electronic Control Units ("ECUs") (e.g., battery control system 102, vehicle control system 104, etc.). As used herein, an ECU may comprise any processor or logic system included in a vehicle 100 and/or any embedded system that monitors and/or controls one or more electrical systems and/or subsystems in the vehicle 100. Functions of the vehicle 100 may be monitored and/or controlled by an ECU or an associated system. In certain embodiments, certain ECUs included in the vehicle 100 may be associated with one or more sensor systems configured to measure and/or estimate operating information and/or parameters related to the vehicle 100. As discussed in more detail below, such information and/or parameters may be used in connection with identifying one or more optimal routes to a desired destination for the vehicle 100.

In certain embodiments, the vehicle 100 may include a battery control system 102. The battery control system 102 may comprise an ECU configured to monitor and/or control certain operations of a battery system included in the vehicle 100. In certain embodiments, the battery system may comprise a battery system configured to power electric drivetrain components of the vehicle 100 (e.g., electric drive motors and the like). Among other functions, the battery control system 102 may be configured to monitor and control charging and/or discharging operations of the battery system. In some embodiments, the battery control system 102 may be configured to estimate and/or monitor one or more parameters relating to the battery system (e.g., in conjunction with one or more communicatively coupled sensors associated with the battery system and/or the like). For example, various parameters relating to a vehicle battery system may be measured and/or estimated by the battery control system 102 including, without limitation, battery charge capacity, discharge times, distances, and/or rates, recharging times and/or rates, and/or any other parameter relating to the battery system and the operation of vehicle 100 in connection with the same.

The vehicle 100 may further include a vehicle control system 104. The vehicle control system 104 may comprise an ECU configured to monitor and/or control a variety of operations of the vehicle 100. For example, the vehicle control system 104 may be configured to monitor and/or control certain functions of the vehicle's drivetrain, vehicle control systems, climate control systems, and/or another vehicle system and/or subsystem. Although the battery control system 102 is illustrated as separate from the vehicle control system 104, in certain embodiments, functionality of the battery control system 102 and the vehicle control system 104 may be incorporated in a single system, in one or more separate systems, or in any other suitable configuration.

In certain embodiments, the vehicle 100 may include a telematics system 106. The telematics system 106 may perform a variety of functions. In certain embodiments, the telematics system 106 may be communicatively coupled with a Global Positioning System ("GPS") transceiver configured to communicate with and receive location information from a satellite navigation system 110. Location information received from the satellite navigation system 110 may be displayed to occupants of the vehicle 100 via a display. In certain embodiments, the telematics system 106 may comprise an OnStar® system, a Lexus Link® system, a BMW Assist® system, and/or any other suitable telematics system by any telematics service provider or manufacturer.

The telematics system 106 may further be configured to collect information from one or more systems of the vehicle 100, to control and/or interact with one or more systems of the vehicle 100 (e.g., a vehicle battery system and/or battery control system 102), to collect and/or provide information useful to a user of the vehicle (e.g., navigational position information, directed driving instructions, etc.) or third party services, and/or to provide any other suitable telematics-related functions. For example, the telematics system 106 may allow a user to remotely start the vehicle 100 or unlock/lock the doors of the vehicle 100 from a device associated with the user. Further, the telematics system 106 may communicate information relating to the vehicle 100 to its occupants including, for example, information related to a specific POI in response to a request from a user (e.g., location and/or mapping lookup) and/or vehicle status information (e.g., battery charge levels).

The vehicle 100 may further include an in-vehicle infotainment ("IVI") system 108. The IVI system 108 may include any suitable combination of systems, components, and/or devices to, among other functions, provide audio and/or audio/visual entertainment services to vehicle occupants, to provide Internet-based services to vehicle occupants, and/or to interface with one or more devices associated with vehicle occupants. For example, the IVI system 108 may be configured to communicate with a mobile device 112 (e.g., via an intra-vehicle wireless communication transceiver) associated with a vehicle occupant. In further embodiments, the IVI system 108 may be configured to interface with an "app store" where vehicle occupants may obtain software applications to execute on the IVI system 108 or other vehicle systems. Although the IVI system 108 is illustrated as separate from the telematics system 106, in certain embodiments, functionality of the telematics system 106 and the IVI system 108 may be incorporated in a single system, in one or more separate systems, or in any other suitable configuration.

Various systems (e.g., systems 102-108) included in and/or associated with the vehicle 100 may be communicatively coupled using a variety of suitable communication networks and/or communication technologies. Network connections may include intra-vehicle communication networks and inter-vehicle networks. In certain embodiments, intra-vehicle networks may utilize one or more communication busses to communicatively couple systems, components, and devices included in and/or associated with the vehicle 100. The communication busses may be interconnected using one or more communication gateways facilitating communication across the busses. In some embodiments, the communication busses may include one or more controller area network ("CAN") busses and be capable of communicating using the CAN bus protocol and/or variants thereof. In certain embodiments, systems, components, and/or devices included in the vehicle 100 may be communicatively coupled without intermediate communication busses. For example, the telematics system 106 may be directly coupled to a GPS transceiver and/or an associated display.

The intra-vehicle networks may include one or more intra-vehicle wireless communication networks. For example, certain vehicle sensor systems (e.g., a tire pressure monitoring sensor system), may be configured to communicate with ECUs included in the vehicle 100 via wireless communication channels utilizing any suitable wireless communication technologies. In certain embodiments, the vehicle may further include an intra-vehicle wireless communication transceiver configured to communicate with devices (e.g., mobile device 112) associated with vehicle users. For example, a mobile phone may be paired with an IVI system 108 of the vehicle 100 (e.g., using Bluetooth® or the like).

Inter-vehicle networks may utilize one or more wireless and/or wired communication technologies. Inter-vehicle networks may allow one or more external systems or devices 114, 116 to communicate with systems, components, or devices included in the vehicle 100. In some embodiments, the vehicle 100 may include an inter-vehicle wireless communication transceiver configured to facilitate inter-vehicle wireless communication with a network 118 using any suitable communication protocol or protocols.

Systems and devices in communication with the vehicle 100 via intra-vehicle and/or inter-vehicle networks may comprise a variety of computing devices and systems, including laptop computer systems, desktop computer systems, sever computer system, smartphones, tablet computers, wireless control devices (e.g., keyless entry or remote start devices), and/or the like. In certain embodiments, the intra-vehicle and/or inter-vehicle wireless networks may comprise wireless carrier systems, such as a personal communications system ("PCS"), a global system for mobile communication, and/or any other suitable communication system incorporating any suitable communication technologies and/or protocols. In further embodiments, the intra-vehicle and inter-vehicle wireless networks may include an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the intra-vehicle and inter-vehicle wireless networks may incorporate one or more satellite communication links. In further embodiments, the intra-vehicle and inter-vehicle wireless networks may utilize IEEE's 802.11 standards, Bluetooth®, ultra-wide band ("UWB"), Zigbee®, and/or any other suitable technology or technologies.

In certain embodiments, various systems disclosed herein may include trusted and/or secure hardware components that facilitate security, trust, and privacy management methodologies. For example, connected devices may include secure processing components and/or environments configured to implement security, trust, and privacy management methodologies to protect personal information relating to vehicle users, and/or to protect vehicle systems or components from inadvertent or malicious tampering or disruption. In some embodiments, systems disclosed herein may further include hardware configured to implement device credentialing, trusted communication, authentication, authorization, key management, policy management and enforcement, and/or the like. For example, technologies such as those described in the '432 application, '693 application, and/or '387 patent could be used.

A variety of services may interact and/or communicate with the vehicle 100 and its constituent systems, components, and/or devices. In certain embodiments, some of the services may be implemented and/or provided, at least in part, by one or more communicatively coupled external systems or devices 114, 116. Examples of services may include, without limitation, GPS-based navigation, traffic, weather and travel information services, entertainment services, information services, Internet-based services (e.g., entertainment and/or software applications), and/or services that involve human agents (e.g., manufacturing supply chain personnel, maintenance personnel, vehicle owners, drivers, and occupants, etc.).

In certain embodiments, the vehicle 100 may be communicatively coupled with a telematics service provider system 114. The telematics service provider system 114 may operate in conjunction with the telematics system 106 included in the vehicle 100 to provide telematics-related services to a user of the vehicle 100. Among other functions, the telematics service provider system 114 may provide navigation-based services, traffic, weather and travel information services, location and/or POI information and/or recommendation services, and/or the like. For example, the telematics service provider system 114 may operate with the telematics system 106 included in the vehicle 100 to provide geographic mapping services using information included in a map database 120 stored and/or maintained by the telematics service provider system 114. The telematics service provider system 114 and/or telematics system 106 may further provide traffic information services using traffic information 122 and/or POI information services using location and/or POI information 126 stored and/or maintained by the telematics service provider system 114. In certain embodiments, services provided by the telematics service provider system 114 may interact with one or more third-party service providers to facilitate the provision of services (e.g., third-party mapping services, traffic information services, POI information services, etc.).

In some embodiments, the telematics service provider system 114 and/or the vehicle 100 may be communicatively coupled with a charging station service provider system 116. The charging station service provider system 116 may interface with an infrastructure of one or more charging stations 128 configured to supply energy to the vehicle 100. In certain embodiments, the charging station service provider system 116 may be associated with a single charging station infrastructure network (e.g., Chargepoint® or the like). In further embodiments, the charging station service provider 116 may be associated with a plurality of charging station infrastructure networks.

The charging station service provider system 116 may provide a variety of information regarding charging stations 128 in communication therewith. For example, the charging station service provider system 116 may maintain station information 130 regarding the connected charging stations 128. The station information 130 may, for example, comprise, among other things, information regarding types of connected charging stations 128 (e.g., charging station connectivity or the like), charging station capabilities, ratings of connected charging stations 128 (e.g., user reviews or ratings or the like), station location information, charging station operating hours, pricing of energy provided by connected charging stations 128 (e.g., on/off peak rates or the like), and/or any other information relating to the charging stations 128.

In further embodiments, the charging station service provider system 116 may maintain information relating to the availability of connected charging stations 128. For example, the charging station service provider system 116 may maintain information regarding a reservation schedule 132 for one or more connected charging stations 128. Among other things, the reservation schedule 132 may comprise information indicating current and/or future availability of connected charging stations 128, current and/or future reservation information relating to the stations 128, user information associated with reservations, and/or any other information pertaining to the use and/or availability of connected charging stations 128.

The reservation schedule 132 may be maintained and/or generated by a station reservation engine 134. The station reservation engine 134 may provide a variety of reservation related functions. For example, the station reservation engine 134 may interact with users and/or other systems in connection with generating reservations, changing reservations (e.g., moving, cancelling, etc.), usage billing, and/or any other function relating to the connected charging stations 128.

Station information 130 and/or reservation schedules 132 may be communicated to a variety of connected systems (e.g., systems of vehicle 100 and/or telematics service provider system 114). Consistent with embodiments disclosed herein, the telematics service provider system 114 and/or telematics system 106 may facilitate intelligent route planning to a desired destination by the vehicle 100 using, at least in part, such information.

In some embodiments, the telematics service provider system 114 and/or the telematics system 106 may identify one or more routes to a desired destination based on one or more available routing parameters. For example, a route determination engine 124 associated with the telematics service provider system 114 may utilize route parameter information provided by the vehicle 100 and/or the charging station service provider system 116, information maintained by the telematics service provider system 114, and/or information provided by one or more third parties (e.g., weather and/or traffic reporting services, mapping services, etc.). In certain embodiments, such route determination may account for vehicle charging and/or refueling requirements.

Routing parameters utilized in identifying one or more routes to a destination may generally include information relating to the vehicle, information relating to an environment of the vehicle, information relating to an associated charging and/or refueling infrastructure, and/or the like. For example, suitable routing parameters used in identifying one or more routes may comprise, without limitation, vehicle charge and/or fuel capacities and/or reserves, charging and/or refueling times, charging and/or refueling infrastructure locations, pricing, compatibility and availability, geographic and environmental factors (e.g., travel distances, traffic conditions, elevation changes, average historical travel times along routes, weather, etc.), consumer ratings, locations of relevant POIs, and/or any other relevant parameter or parameters that may be utilized in connection with determining an optimal route of a vehicle to a desired destination. It will be appreciated that a variety of other types of routing parameters may be utilized in connection with route identification, and that any information that may influence route identification decision processes may be used in connection with the disclosed embodiments.

In some embodiments, a variety of possible routes to a desired destination based on available routing parameters may be presented to a user of a vehicle 100. A user may select a route from the identified routes and be provided with directed driving instructions associated with the selected route to the destination (e.g., via turn-by-turn directions or the like provided by the telematics system 106). In further embodiments, an optimal route may be automatically selected and/or recommended to a user based on a calculated cost associated with the route, as, for example, discussed in more detail below in reference to FIG. 2.

When a route is selected (e.g., automatically selected or selected by a user of the vehicle 100), information regarding the selected route may be communicated to the telematics service provider system 114 and/or the charging station service provider system 116. Based on the information, the charging station service provider system 116 (e.g., the station reservation engine 134) may generate and distribute reservation information to one or more charging stations 128 associated with the selected route. In certain embodiments, generating and distributing reservation information to one or more charging stations 128 may ensure charging station 128 availability as the vehicle 100 travels along the selected route. Reservation generation in response to route selection is discussed below in more detail in reference to FIG. 3.

In certain embodiments, systems and methods disclosed herein may account for variable rate pricing models based on-peak and/or off-peak electric power resource utilization. Such pricing models may be used in route cost determinations. For example, a user of vehicle 100 may begin a 200 mile journey at 7:30 AM. The vehicle battery may be charged to 100% capacity and have an average range of 130 miles per charge under existing driving conditions. Based on a distance to the destination, the vehicle's range, locations of charging stations 128, and/or other factors, it may be determined that the vehicle 100 will need to charge two times so as to leave sufficient battery charge to start a return journey. Options for first charging stations locations may be, for example, located 90 miles and 110 miles into the journey. A calculated time of arrival at the charging station located 90 miles away may be approximately 8:53 AM and may be 9:11 AM at the charging station located 110 miles away. If off-peak discounted electricity rates extend to 9:00 AM, the cost of the journey may be reduced by selecting the charging station 90 miles away.

It will be appreciated that a number of variations can be made to the architecture and relationships presented in connection with FIG. 1 within the scope of the inventive body of work. For example, certain system functionalities described above (e.g., functionalities of vehicle 100 systems, telematics service provider system 114, and/or charging station service provider system 116) may be integrated into a single system and/or any suitable combination of systems in any suitable configuration. Similarly, it will be appreciated that although discussed in reference to an electrical charging station network for a vehicle 100 powered by a battery system, embodiments of the systems and methods disclosed herein may be implemented in a variety of other vehicle energy source charging and/or fueling infrastructures (e.g., gasoline infrastructures, diesel infrastructures, fuel cell infrastructures, natural gas infrastructures, etc.). Thus it will be appreciated that the architecture of FIG. 1 is provided for purposes of illustration and explanation, and not limitation.

Figure 2:
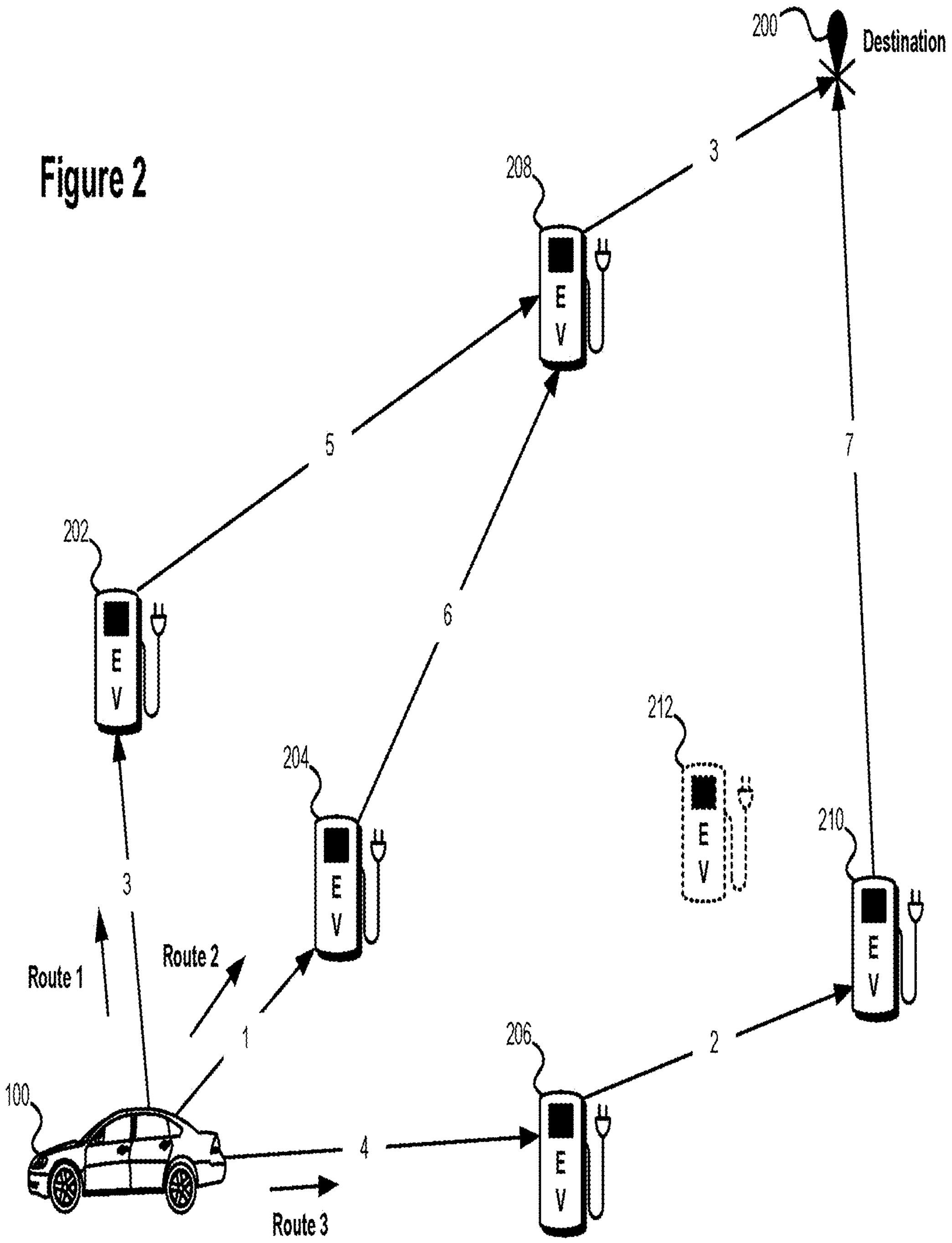
FIG. 2 illustrates a diagram showing exemplary vehicle route determination and scoring consistent with embodiments of the present disclosure.

FIG. 2 illustrates a diagram showing exemplary vehicle route determination and scoring consistent with embodiments of the present disclosure. Particularly, FIG. 2 illustrates a plurality of identified routes (i.e., Route 1, Route 2, and Route 3) for the vehicle 100 to arrive at a desired destination 200.

In certain embodiments, a user of a vehicle 100 may indicate his or her desire to travel to a destination 200 (e.g., via a telematics system or another suitable system). Based on a variety of available routing parameters, one or more routes to the desired destination 200 may be identified. For example, a determination may be made that, based on an amount of charge remaining in the vehicle 100, the vehicle may travel a certain distance before needing to be recharged. One or more charging stations may be identified within a range corresponding to the distance the vehicle 100 can travel before needing to be recharged, and one or more routes may be identified associated with the one or more charging stations within range of the vehicle 100. For example, as illustrated, charging stations 202-206 may be within range of the vehicle 100 and, accordingly, may be utilized as an intermediate charging stop on routes to the destination 200 (i.e., Routes 1-3). Charging station 212 may be out of range of the vehicle 100, however, and thus may not be utilized as an intermediate charging stop in route identification operations.

If additional intermediate charging stops are required for the vehicle 100 to reach the desired destination 200 (e.g., as determined by a range of the vehicle 100 after charging), one or more additional intermediate charging stations along associated routes to the destination 200 may be identified. Accordingly, in some circumstances, identified routes may be associated with a plurality of intermediate charging stops corresponding to particular charging station locations. For example, as illustrated, Route 1 may include intermediate stops at charging stations 202 and 208, Route 2 may include intermediate stops at charging stations 204 and 208, and Route 3 may include intermediate stops at charging stations 206 and 210.

As discussed above, a variety of routing parameters may be utilized in connection with identifying routes and/or intermediate stops associated with routes. In certain circumstances, travel ranges of the vehicle used in identifying intermediate charging stops may be dynamically adjusted based on a variety of available parameters. For example, elevation changes, weather along routes, traffic conditions, and/or any other parameter may affect the effective range of the vehicle 100. Accordingly, in estimating a range of the vehicle 100 and identifying associated charging station locations along routes, a variety of routing parameters may be used.

In certain embodiments, each route may have an associated cost that may be calculated (e.g., calculated by a telematics service provider system and/or a route determination engine executing thereon). In some embodiments, an optimal route may be automatically selected and/or recommended to a user based on the calculated cost associated with the route. Calculated costs or routes may account for a variety of factors including, without limitation, some or all of travel time along the route, predicted energy usage along the route, pricing at recharging and/or refueling stations along the route, scenic value of along the route, any/or any other relevant routing parameter associated with the route. In certain embodiments, relative importance and/or weights of such factors may be set by a user for use in calculating route costs. Automatically selecting and/or presenting a user with a recommended optimal route based on a route cost determination may allow for a shorter, more efficient, and/or less expensive journey to the desired destination 200 by vehicle 100.

Each leg of a route may have an associated calculated cost (e.g., each leg between intermediate stops along the route). The total cost of a route may be associated with the sum of the calculated costs of its constituent legs. For example, as illustrated in FIG. 2, Route 1 may have a first leg between the vehicle's origin point and the location of charging station 202 having a calculated cost of "3", a second leg between the location of charging station 202 and the location of charging station 208 having a calculated cost of "5", and a third leg between the location of the charging station 208 and the destination 200 having a calculated cost of "3". Accordingly, the total calculated cost of Route 1 may be "11". Route 2 may have a total calculated cost of "10" and Route 3 may have a total calculated cost of "13". Accordingly, Route 2 may be automatically selected and/or recommended to a user of the vehicle 100 as the optimal route for reaching destination 200.

In certain embodiments, a user may adjust the relative importance and/or weights of factors used to calculate costs associated with identified routes, thus adjusting identified optimal routes. For example, a user may indicate they wish to place greater importance on the scenic value of routes to their desired destination 200 (e.g., based on information included in a database providing route scenic value information, ratings, etc.). Based on such an indication, optimal routes may be presented to the user based on their scenic value.

It will be appreciated that a wide variety of parameters and/or user preferences may be utilized in calculating and comparing costs associated with a route and/or its constituent legs, and that any information that may influence identification of an optimal route to a user may be used in connection with the disclosed embodiments. Moreover, although cost-optimization methods are used in some of the illustrated embodiments of identifying optimal routes for traveling to a desired destination, other techniques for determining an optimal route may also, or alternatively, be used, including, for example, techniques using machine-learning methods and processes.

Figure 3:
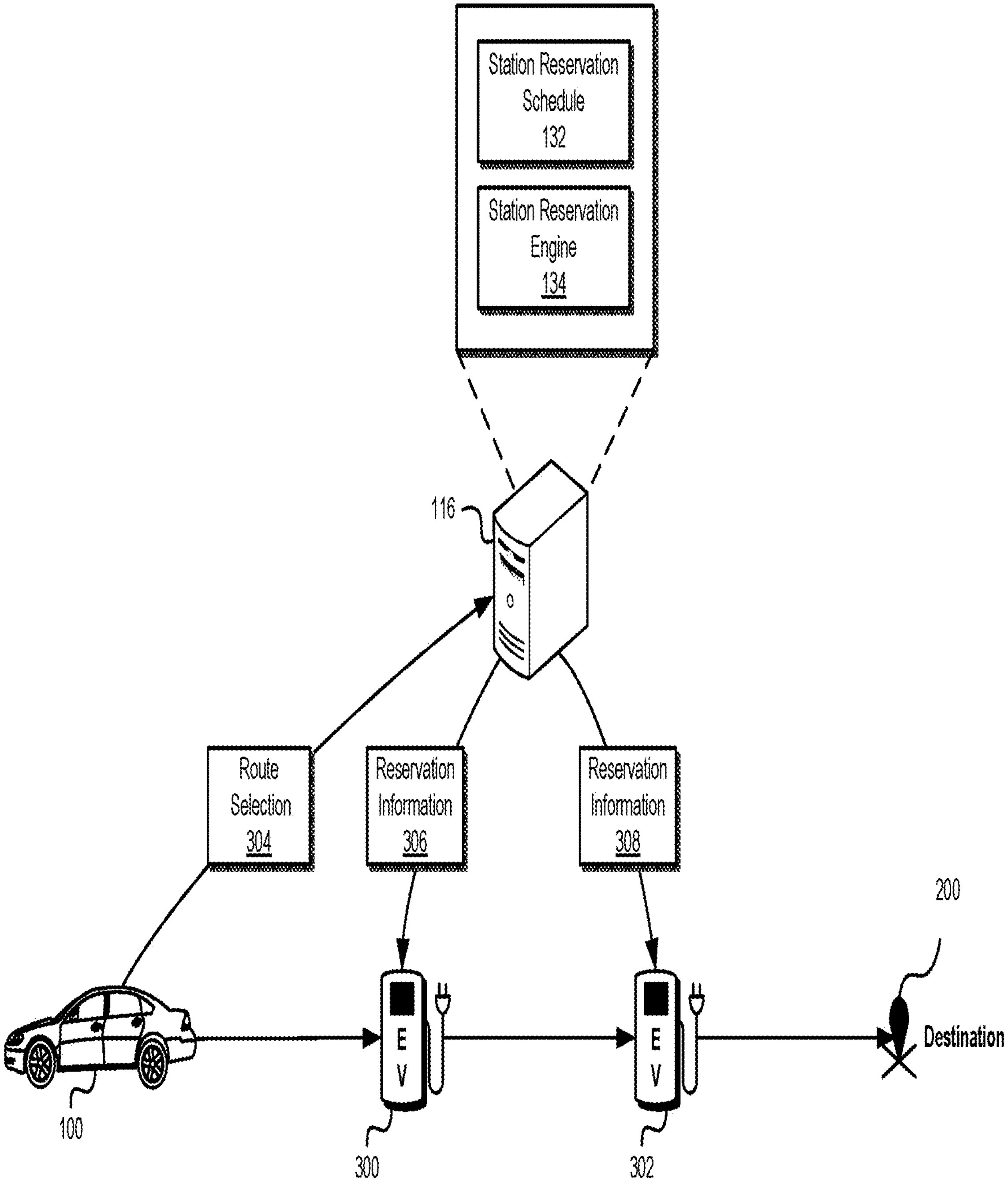
FIG. 3 illustrates an exemplary architecture for generating one or more charging station reservations based on a selected vehicle route consistent with embodiments of the present disclosure.

FIG. 3 illustrates an exemplary architecture for generating one or more charging station reservations 306, 308 based on a selected vehicle route consistent with embodiments of the present disclosure. Systems and methods disclosed herein may be utilized in connection identifying one or more routes to a destination 200 for a vehicle 100 (e.g., one or more optimal routes to the destination). In certain circumstances, identified routes may include one or more intermediate stops for charging of vehicle 100. For example, as illustrated in FIG. 3, the vehicle 100 may stop at intermediate locations associated with charging stations 300 and 302 to perform charging operations en route to destination 200.

In some embodiments, a route may be selected by a user or automatically be selected based on being identified as an optimal route to the destination using the optimization techniques described herein. Once a route is selected, route selection information 304 may be communicated to the charging station service provider system 116 and/or another suitable system. For example, in some embodiments, the route selection information 304 may be communicated to the charging station service provider system 116 directly from the vehicle 100 (e.g., from a vehicle telematics system). In other embodiments, the vehicle 100 may communicate route selection information 304 to an intermediate system (e.g., a telematics service provider system or the like) which may communicate the route selection information 304 to the charging station service provider system 116. Thus, it will be appreciated that the route selection information may be communicated and stored in any suitable manner.

The route selection information 304 may comprise information identifying one or more charging stations 300 and 302 along the selected route. The route selection information 304 may further comprise information that may be utilized in determining and/or estimating when the vehicle 100 will arrive at the one or more charging stations 300 and 302. For example, the route selection information 304 may comprise one or more estimated arrival times at the one or more charging stations 300 and 302 during the vehicle's journey to destination 200. The route selection information 304 may further comprise one or more estimates of the amount of time the vehicle 100 will need to be at a charging station (e.g., including an estimate of the amount of time needed to wait for a charging station to become available, and the amount of time needed to actually charge the vehicle's battery).

Based on the route selection information 304, the charging station service provider system 116 and/or a station reservation engine 134 executing thereon may generate and distribute reservation information 306, 308 to charging stations 300, 302 and update a station reservation schedule 132 view of the reservation information 306, 308. By generating and distributing reservation information to charging stations 300, 302, availability of the charging stations 300, 302 may be ensured when the vehicle arrives at the charging stations 300, 302 for recharging operations.

In certain embodiments, the charging station service provider system 116 and/or a station reservation engine 134 may receive updated information as the vehicle 100 progresses along the route that may adjust certain estimated arrival times at charging stations 300, 302. For example, the vehicle 100 may experience unexpected traffic delays that may delay the times at which the vehicle 100 is estimated to arrive at charging stations 300, 302. Accordingly, updated reservation generation information may be generated and distributed to charging stations 300, 302 reflecting updated arrival times. In this manner, availability of the charging stations 300, 302 may be ensured even if estimated arrival times and/or conditions change as the vehicle 100 progresses along the route.

Figure 4:
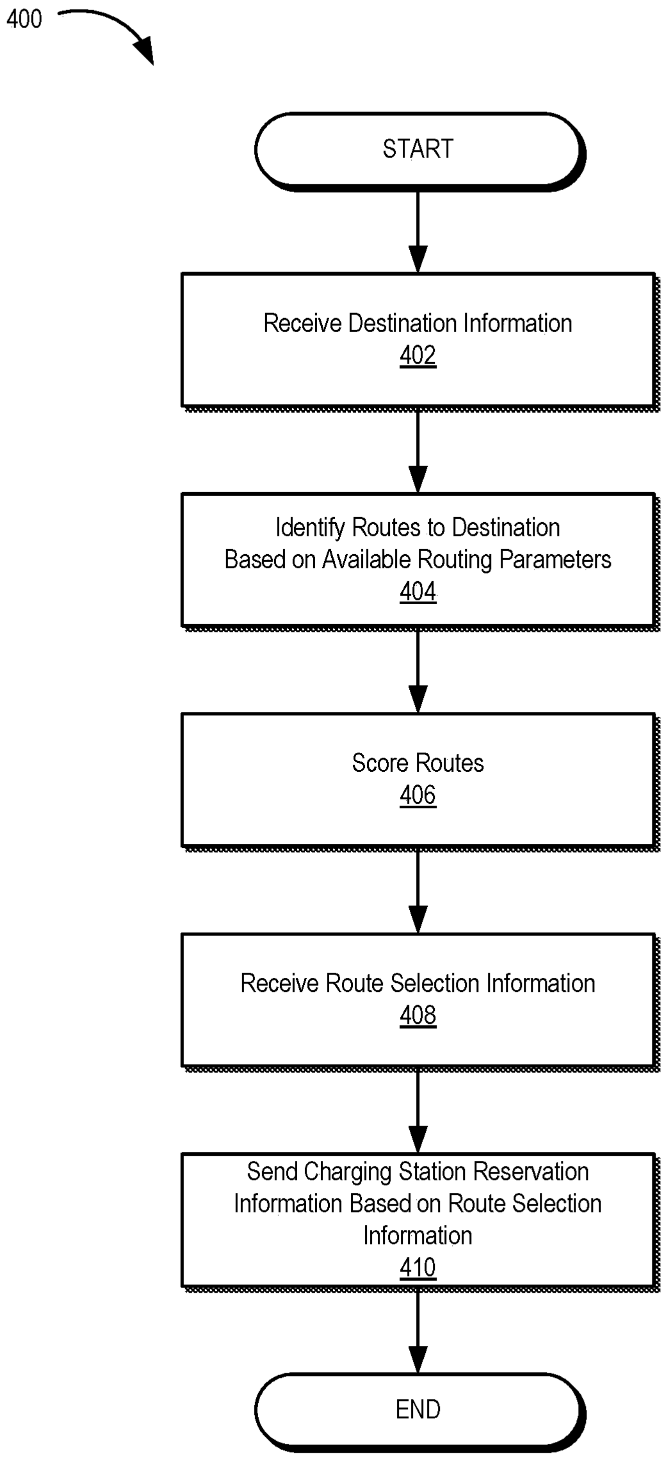
FIG. 4 illustrates a flow chart of an exemplary method of selecting a vehicle route and generating one or more charging station reservations consistent with embodiments of the present disclosure.

FIG. 4 illustrates a flow chart of an exemplary method 400 of selecting a vehicle route and generating one or more charging station reservations consistent with embodiments of the present disclosure. In certain embodiments, the illustrated method 400 and/or its constituent steps may be performed by a telematics system, a telematics service provider system, a charging station service provider station, and/or any other suitable system. At 402, destination information may be received. The destination information may identify one or more desired destinations indicated by a user of a vehicle (e.g., indicated via a telematics system of a vehicle or the like).

At 404, one or more routes to the destination identified at 402 may be determined based on available routing parameters. In certain embodiments, the identified routes may account for vehicle charging and/or refueling requirements. Routing parameters utilized in connection with the determination at 404 may include, without limitation, vehicle charge and/or fuel capacities and/or reserves, charging and/or refueling times, charging and/or refueling infrastructure locations, pricing, compatibility and availability (e.g., wait times at the estimated arrival time), geographic and environmental factors (e.g., travel distances, traffic conditions, elevation changes, historical travel times along routes, weather, etc.), consumer ratings, locations or relevant POIs, and/or any other relevant parameter or parameters that may be utilized in connection with determining an route of a vehicle to a desired destination.

The routes identified at 404 may be scored at 406. In certain embodiments, such scoring may be utilized to determine an optimal and/or recommended route from the identified routes. In certain embodiments, routes may be scored according to calculated costs associated with the identified routes. Calculated costs for routes may account for a variety of factors including, without limitation, travel time along the route, predicted energy usage along the route, pricing at recharging and/or refueling stations along the route, scenic value of the route, any/or any other relevant routing parameter associated with the route. In certain embodiments, relative weights and/or importance of factors used to calculated costs of routes may be adjusted by a user based on personal preferences.

A user may be presented with one or more identified routes and associated scoring/cost information. In certain embodiments, a variety of possible routes to a desired destination may be presented. In other embodiments, an optimal route based on associated scoring/cost information may be presented to a user. At 408, route selection information may be received (e.g., received from a user of the vehicle) identifying a particular route. In certain embodiments, the route identified in the route selection information may be automatically selected based on its associated scoring/cost information (e.g., as may be the case if the route is determined to be an optimal route). In further embodiments, the route identified in the route selection information may be selected by a user (e.g., via a telematics system) from a plurality of presented possible routes.

At 410, reservation information may be generated and distributed to one or more charging stations associated with the selected route. By generating and distributing reservation information to charging stations associated with the route, availability of the charging stations for recharging operations at the time the vehicle arrives at the stations may be ensured.

Figure 5:
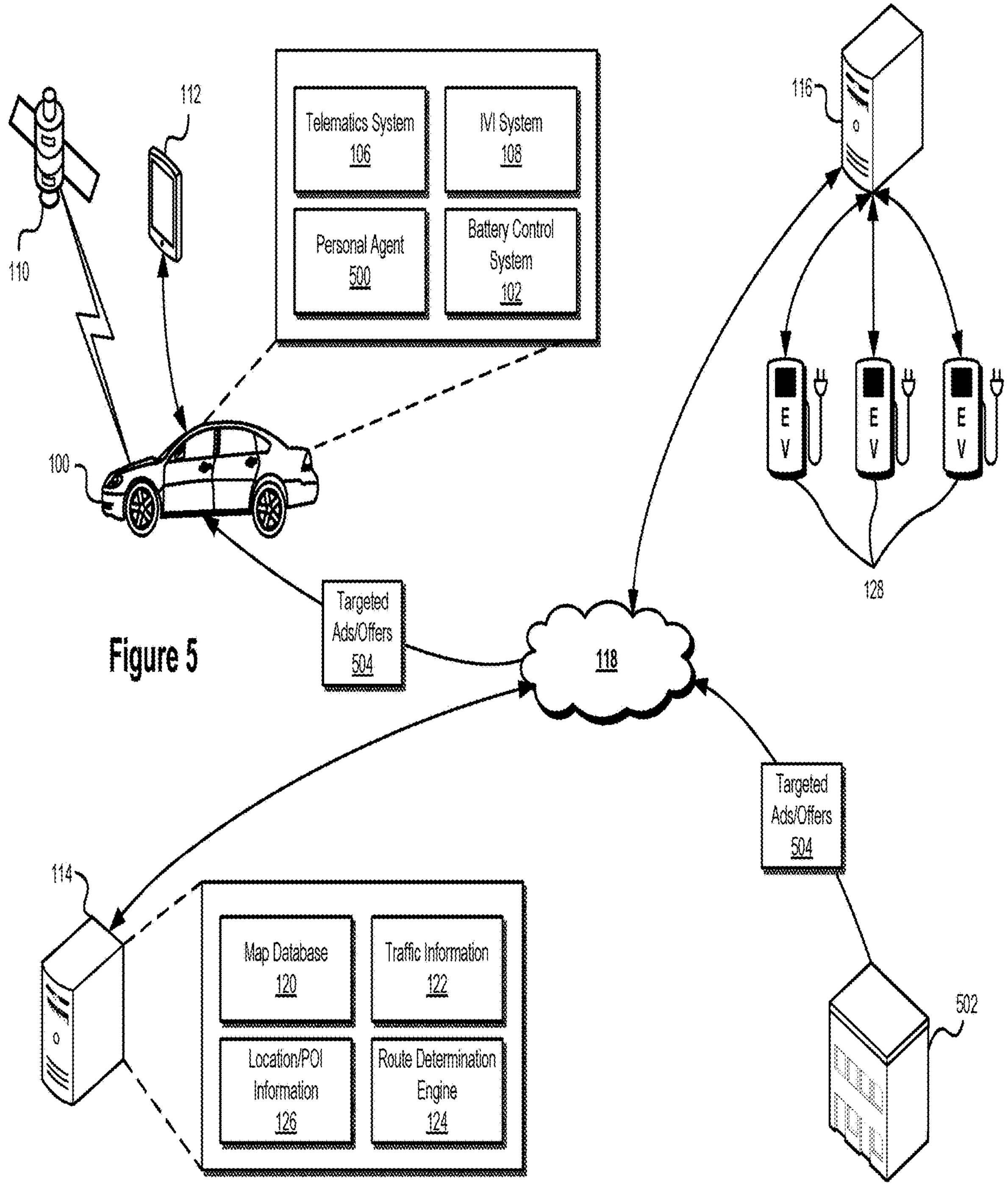
FIG. 5 illustrates an exemplary route selection architecture integrating targeted advertising services consistent with embodiments of the present disclosure.

FIG. 5 illustrates an exemplary route selection architecture integrating information targeting services consistent with embodiments of the present disclosure. More specifically, FIG. 5 illustrates a connected vehicle 100 and an associated ecosystem facilitating information targeting in connection with intelligent route planning consistent with embodiments disclosed herein.

Systems and methods disclosed herein may provide for targeting of information 504 (e.g., advertisements, offers, promotions, content, etc.) to a user of a vehicle based on personal information related to the user to ensure the targeted information is well-matched to the user's interests. For example, personal information provided by a user and/or generated based on a user's activities may be utilized to effectively match advertisements 504 to the interests of the user. Based on the personal information, a system the user interacts with, a content provider or distributor, and/or a trusted third party may target information 504 to the user matched to user interests identified from the personal information.

Personal information may be obtained as users consume content and/or interact with devices and/or services. For example, as a user interacts with a telematics system 106 and/or an IVI system 108 of a vehicle 100, personal information may be obtained. Personal information may include, without limitation, user attributes such as gender, age, content preferences, geographic location, attributes and information associated with a user's friends, content, and group included in the user's social networks, and/or information related to content usage patterns including what content is consumed, content recommendations, ad viewing patterns, and/or the like. Based on the personal information, the device, a content provider or distributor, and/or a trusted third party may target ads to the user matched to user interests identified from the personal information, utilizing, for example, information targeting technologies such as those described in the '406 application and/or '538 application. In some embodiments, personal information may be maintained and/or managed using a personal agent 500, such as that described in the '406 application or '538 application, operating in the vehicle 100 and/or on an associated device or system.

In certain embodiments, personal information associated with a user may be utilized to identify one or more POIs proximate to an identified route that the user may have an interest in visiting during the journey to his or her destination. In some embodiments, such identification may be performed by a telematics service provider system 114 using, for example, location and/or POI information 126 stored and/or maintained by the telematics service provider system 114.

Identified POIs may be presented to a user in connection with one or more identified routes. In addition, one or more targeted advertisements, promotions, offers, etc. 504 may be presented to a user in connection with the one or more identified routes distributed by, for example, an information targeting service provider 502 offering targeted information services. Using such information, a user may select a route having nearby POIs that he or she may wish to visit en route to a desired destination. Similarly, a user may select a route having POIs associated with advertisements and/or offers that the user would like to use in connection with a visit to a POI.

Figure 6:
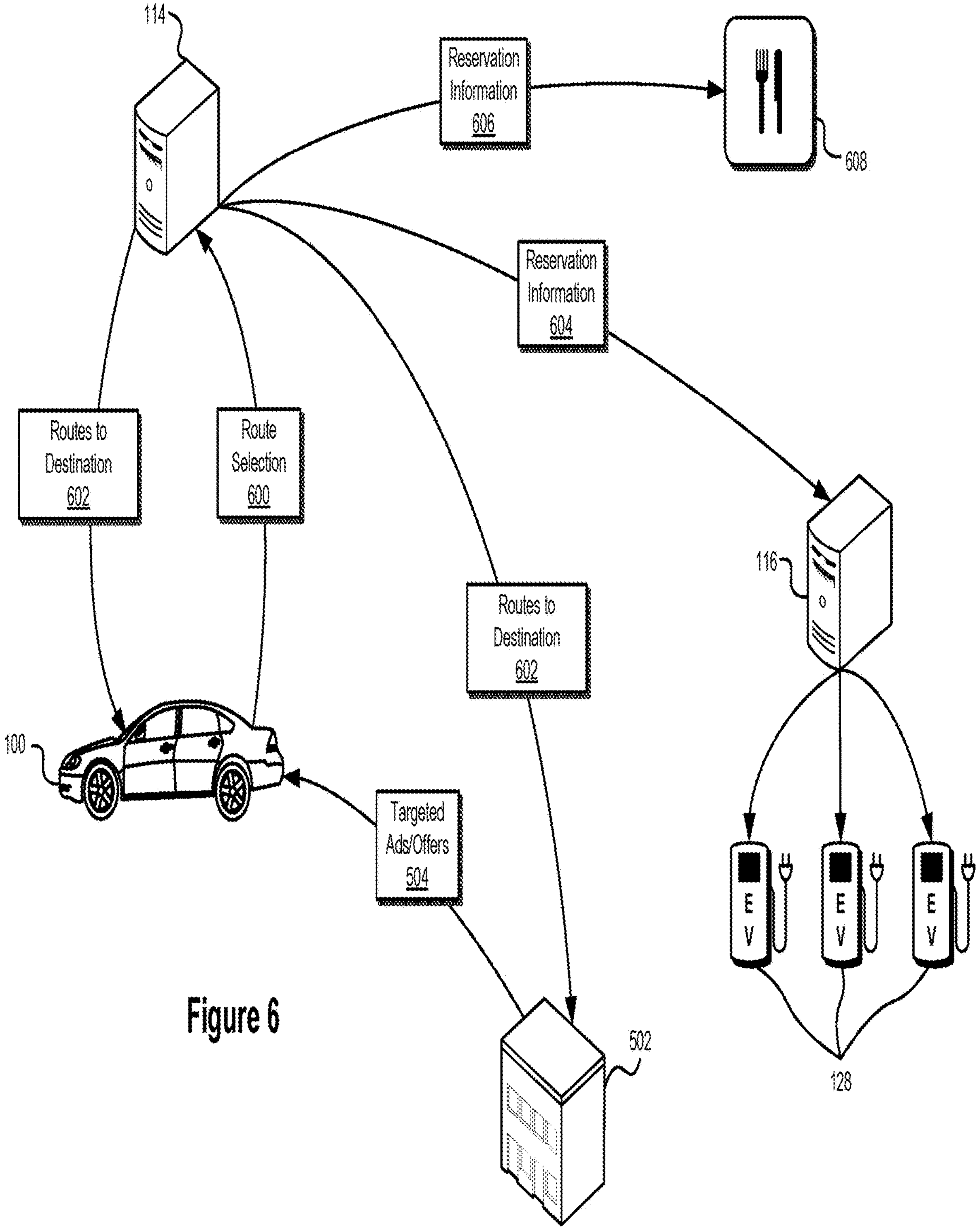
FIG. 6 illustrates an exemplary architecture for generating one or more reservations based on a selected vehicle route consistent with embodiments of the present disclosure.

FIG. 6 illustrates an exemplary architecture for generating one or more reservations 604, 606 based on a selected vehicle route consistent with embodiments of the present disclosure. In certain embodiments, one or more routes to a destination 602 identified by a telematics service provider system 114 may be communicated to a vehicle 100 (e.g., communicated to a vehicle telematics system) and/or a targeted advertising service provider 502. One or more targeted advertisements 504 associated with POIs proximate to the identified routes may further be communicated to the vehicle 100 by the targeted advertising service provider 502. In certain embodiments, the one or more targeted advertisements 504 may be presented to a vehicle user in connection with the one or more identified routes 602.

A route selection 600 indicating a selected route of the identified routes 602 may be communicated to the telematics service provider system 114. In certain embodiments, the route may be automatically selected by a user or be automatically selected based on being identified as an optimal route (e.g., using cost-optimization techniques or the like). In certain embodiments, the route associated with the route selection 600 may include one or more intermediate stops. For example, the route may include one or more intermediate stops for charging associated with one or more charging stations 128 and/or one or more stops to visit POIs associated with the route (e.g., a restaurant 608 or the like).

The route selection information 600 may comprise information identifying one or more charging stations 128 and/or POIs 608 along the selected route. The route selection information 600 may further comprise information that may be utilized in determining and/or estimating when the vehicle 100 will arrive at the one or more charging stations 128 and/or POIs 608. For example, the route selection information 600 may comprise one or more estimated arrival times at the one or more charging stations 128 and/or POIs 608 during the vehicle's journey to the desired destination.

Based on the route selection information 600, the telematics service provider system 114, the charging station service provider system 116, and/or any other suitable system may generate and distribute reservation information 604, 606. For example reservation information 604 may be distributed to charging stations 128 at stops along the route and associated station reservation schedules may be updated. Similarly, reservation information 606 may be distributed to POIs 608. By generating and distributing reservation information 604, 606, availability of the charging stations 128 and/or POIs 608 may be ensured when the vehicle 100 arrives at the corresponding intermediate stops along the routes.

Figure 7:
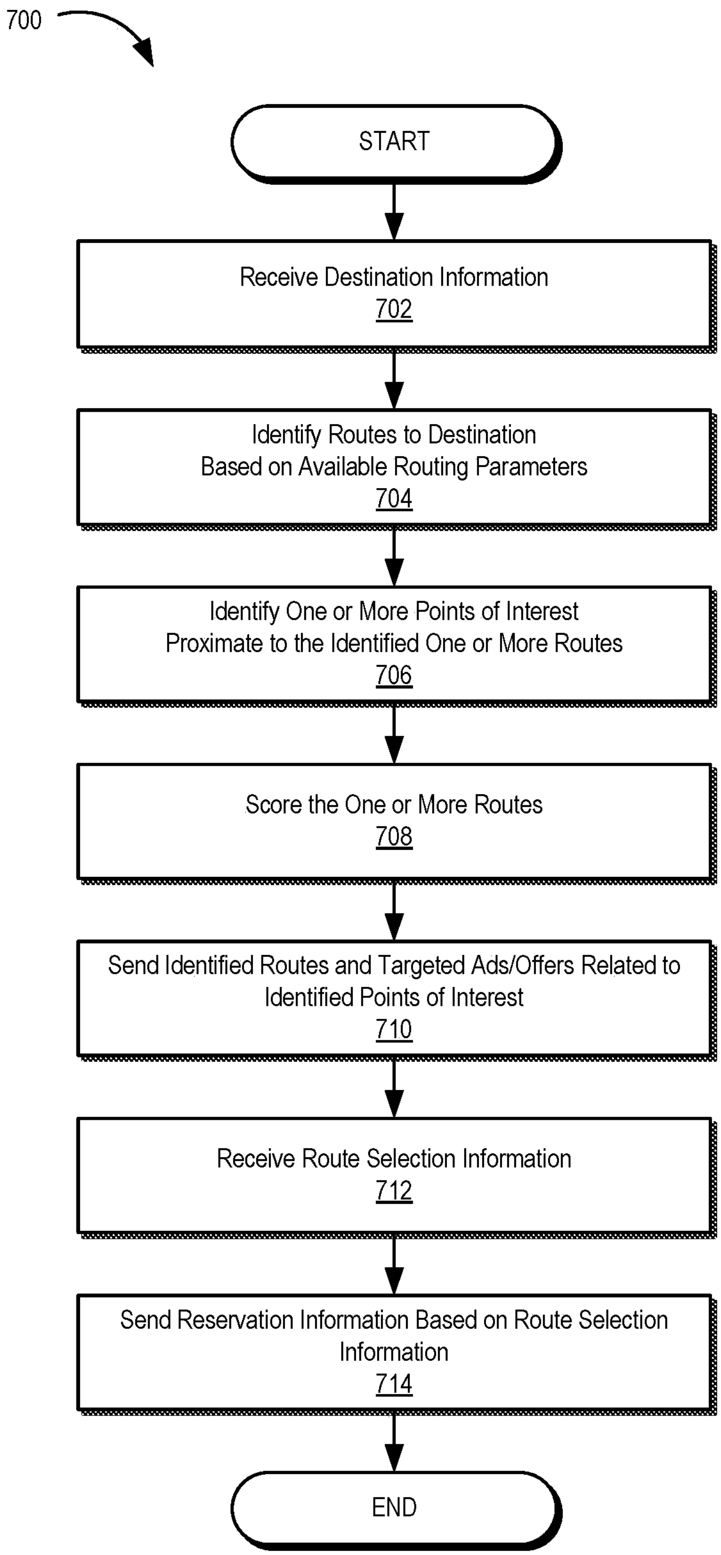
FIG. 7 illustrates a flow chart of an exemplary method of selecting a vehicle route and generating associated reservations consistent with embodiments of the present disclosure.

FIG. 7 illustrates a flow chart of an exemplary method 700 of selecting a vehicle route and generating associated reservations consistent with embodiments of the present disclosure. In certain embodiments, the illustrated method 700 and/or its constituent steps may be performed by a telematics system, a telematics service provider system, a charging station service provider station, and/or any other suitable system. At 702, destination information may be received. The destination information may identify one or more desired destinations indicated by a user of a vehicle (e.g., indicated via a telematics system of a vehicle or the like).

At 704, one or more routes to the destination identified at 702 may be determined based on available routing parameters. In certain embodiments, the identified routes may account for vehicle charging and/or refueling requirements. Routing parameters utilized in connection with the determination at 704 may include, without limitation, vehicle charge and/or fuel capacities and/or reserves, charging and/or refueling times, charging and/or refueling infrastructure locations, pricing, compatibility and availability, geographic and environmental factors (e.g., travel distances, traffic conditions, elevation changes, average historical travel times along routes, weather, etc.), consumer ratings, locations of relevant POIs, and/or any other relevant parameter or parameters that may be utilized in connection with determining a route of a vehicle to a desired destination.

At 706, one or more POIs proximate to the routes identified at 704 may be determined. In certain embodiments, the one or more POIs may be identified based on interests reflected in personal information related to a vehicle user. The identified routes may be scored at 708. In certain embodiments, the scoring may be utilized to determine an optimal and/or recommended route from the identified routes. In certain embodiments, routes may be scored, at least in part, according to calculated costs associated with the identified routes. Calculated costs for routes may account for a variety of factors including, without limitation, travel time along the route, predicted energy usage along the route, pricing at recharging and/or refueling stations along the route, POIs along the routes, user interests reflected in personal information, scenic value of the route, and/or any other relevant routing parameter associated with the route. In certain embodiments, relative weights and/or importance of factors used to calculate costs of routes may be adjusted by a user and/or via machine learning based on personal preferences.

One or more identified routes and associated scoring/cost information may be sent to a vehicle user at 710. Further advertisements and/or offers relating to POIs identified at 706 may be sent to the user at 710 and presented in connection with the identified routes. In certain embodiments, a variety of possible routes to a desired destination may be presented along with associated advertisements and/or offers. In other embodiments, an optimal route based on associated scoring/cost information may be presented to a user along with associated advertisements and/or offers.

At 712, route selection information may be received from a user of the vehicle identifying a particular route. In certain embodiments, the route identified in the route selection information may be automatically selected based on its associated scoring/cost information (e.g., as may be the case if the route is determined to be an optimal route). In further embodiments, the route may be selected by a user (e.g., via a telematics system) from a plurality of presented possible routes and associated advertisements and/or offers.

At 714, reservation information may be generated and distributed to one or more charging stations associated with the selected route. Further, reservation information may be generated and distributed to one or more POIs associated with the selected route. By generating and distributing reservation information to charging stations and/or POIs associated with the route, availability of the charging stations for recharging operations and/or POIs at the time the vehicle arrives at the locations may be ensured.

Figure 8:
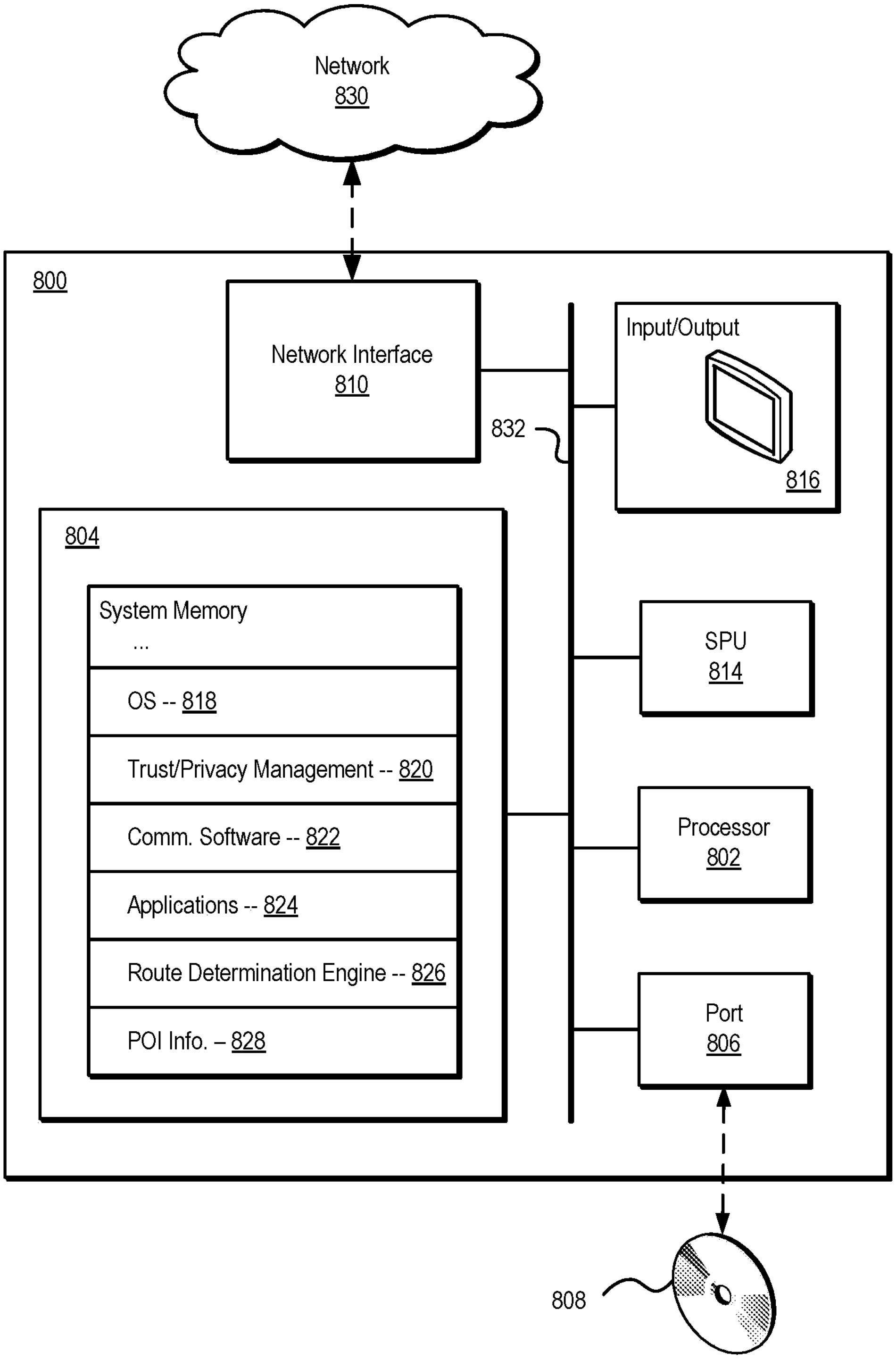
FIG. 8 illustrates an exemplary system that may be used to implement embodiments of the systems and methods disclosed herein.

FIG. 8 illustrates an exemplary system 800 that may be used to implement embodiments of the systems and methods disclosed herein. The exemplary system 800 may comprise a telematics system, an IVI system, a telematics service provider system, a charging station service provider system, an advertisement service provider system, and/or any other system configured to implement embodiments of the systems and methods disclosed herein. As illustrated in FIG. 8, the system 800 may include: a processing unit 802; system memory 804, which may include high speed random access memory ("RAM"), non-volatile memory ("ROM"), and/or one or more bulk non-volatile computer-readable storage mediums (e.g., a hard disk, flash memory, etc.) for storing programs and other data for use and execution by the processing unit 802; a port 806 for interfacing with removable memory 808 that may include one or more diskettes, optical storage mediums, flash memory, thumb drives, USB dongles, compact discs, DVDs, etc., and/or other non-transitory computer-readable storage mediums; a network interface 810 for communicating with other systems via one or more network connections 830, and the like using one or more communication technologies; a user interface 816 that may include a display and/or one or more input/output devices such as, for example, a touchscreen, a keyboard, a mouse, a track pad, and the like; and one or more busses 832 for communicatively coupling the elements of the system 800.

In some embodiments, the system 800 may, alternatively or in addition, include a secure processing unit ("SPU") 814 that is protected from tampering by a user of system 800 or other entities by utilizing secure physical and/or virtual security techniques. An SPU 814 can help enhance the security of sensitive operations such as personal information management, trusted credential and/or key management, privacy and policy management, and other aspects of the systems and methods disclosed herein. In certain embodiments, the SPU 814 may operate in a logically secure processing domain and be configured to protect and operate on secret information. In some embodiments, the SPU 814 may include internal memory storing executable instructions or programs configured to enable to the SPU 814 to perform secure operations.

The operation of the system 800 may be generally controlled by a processing unit 802 and/or a SPU 814 operating by executing software instructions and programs stored in the system memory 804 (and/or other computer-readable media, such as removable memory 808). The system memory 804 may store a variety of executable programs or modules for controlling the operation of the system 800. For example, the system memory 804 may include an operating system ("OS") 818 that may manage and coordinate, at least in part, system hardware resources and provide for common services for execution of various applications, and a trust and privacy management system 820 for implementing trust and privacy management functionality including protection and/or management of personal information. The system memory 804 may further include, without limitation, communication software 822 configured to enable in part communication with and by the system 800, applications 824 (e.g., media applications), a route determination engine 826, POI information 828, and/or any other information and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the system to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause a computer system to perform a method according to the instructions. In certain embodiments, the non-transitory storage medium may take any form capable of storing processor-readable instructions on a non-transitory storage medium. A non-transitory storage medium may be embodied by a compact disk, digital-video disk, Blu-ray disc, other optical storage, a magnetic tape, a magnetic disk, flash memory, integrated circuits, or any other non-transitory memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method of determining a route for an electric-powered vehicle performed by a system comprising at least one processor and at least one non-transitory computer-readable storage medium storing instructions that, when executed by the at least one processor, cause the system to perform the method, the method comprising:

receiving destination selection information identifying a destination;

receiving, from a battery control system associated with a battery system of the vehicle, an indication of an available battery system charge level of the battery system;

determining at least one estimated range of the vehicle based on the available battery system charge level;

identifying a plurality of routes to the destination based on the at least one estimated range of the vehicle and locations of one or more charging stations;

identifying one or more points of interest, each point of interest of the one or more points of interest being identified based on a relative proximity of the point of interest to a location of a charging station of the one or more charging stations, at least one point of interest of the one or more points of interest being associated with promotional content;

determining one or more estimated arrival times of the vehicle at the locations of the one or more charging stations along the plurality of routes;

determining, for each charging station of the one or more charging stations, charging station availability at an associated estimated arrival time of the vehicle of the one or more estimated arrival times;

calculating a cost associated with each route of the plurality of routes based on one or more of the charging station availability and the promotional content;

generating route information, the route information identifying the plurality of routes and the calculated cost associated with each route; and generating at least one signal to display at least a portion of the route information to a user of the vehicle.

2. The method of claim 1, wherein the method further comprises receiving an indication of a selected route of the plurality of routes.

3. The method of claim 2, wherein the method further comprises generating navigation instructions associated with the selected route, the navigation instructions providing directed instructions for traveling to the destination.

4. The method of claim 3, wherein the method comprises sending the navigation instructions to a system associated with the vehicle.

5. The method of claim 3, wherein the method comprises sending the navigation instructions to a device associated with the user of the vehicle.

6. The method of claim 2, wherein the indication of the selected route of the plurality of routes is received from the user of the vehicle.

7. The method of claim 2, wherein the indication of the selected route of the plurality of routes is automatically received in response to determining that the selected route is associated with the lowest calculated cost of the plurality of routes.

8. The method of claim 1, wherein identifying the plurality of routes to the destination is further based on one or more routing parameters.

9. The method of claim 8, wherein the one or more routing parameters comprise at least one of a total vehicle charge capacity, charging station availability, a geographic parameter, an environmental parameter, charging station consumer ratings, user interest information, and point of interest information.

10. The method of claim 9, wherein the user interest information comprises interest information volunteered by the user.

11. The method of claim 10, wherein the user interest information comprises user attribute information.

12. The method of claim 11, wherein the user attribute information comprises one or more of a user gender, age, content preferences, geographic location, and information relating to network contacts of the user.

13. The method of claim 9, wherein the user interest information comprises information generated based on prior monitored user activities.

14. The method of claim 9, wherein the user interest information comprises information generated based on user content consumption patterns.

15. The method of claim 1, wherein calculating the cost associated with each route of the plurality of routes is further based on one or more routing parameters.

16. The method of claim 15, wherein the one or more routing parameters comprise at least one of a total vehicle charge capacity, charging station availability, a geographic parameter, an environmental parameter, charging station consumer ratings, user interest information, point of interest information, and travel time.

17. The method of claim 15, wherein the method further comprises receiving an indication of a weight associated with each of the one or more routing parameters.

18. The method of claim 17, wherein calculating the cost associated with each route of the plurality of routes is based on the relative weight associated with each of the one or more routing parameters.

19. The method of claim 1, wherein the promotional content comprises at least one of an advertisement associated with a respective point of interest of the one or more points of interest and an offer associated with a respective point of interest of the one or more points of interest.

* * * * *